June 24, 1969 N. SZEREMY 3,452,153
PULSE CIRCUIT FOR HORIZONTAL OUTPUT CIRCUIT IN TELEVISION RECEIVER
Filed Sept. 14, 1966
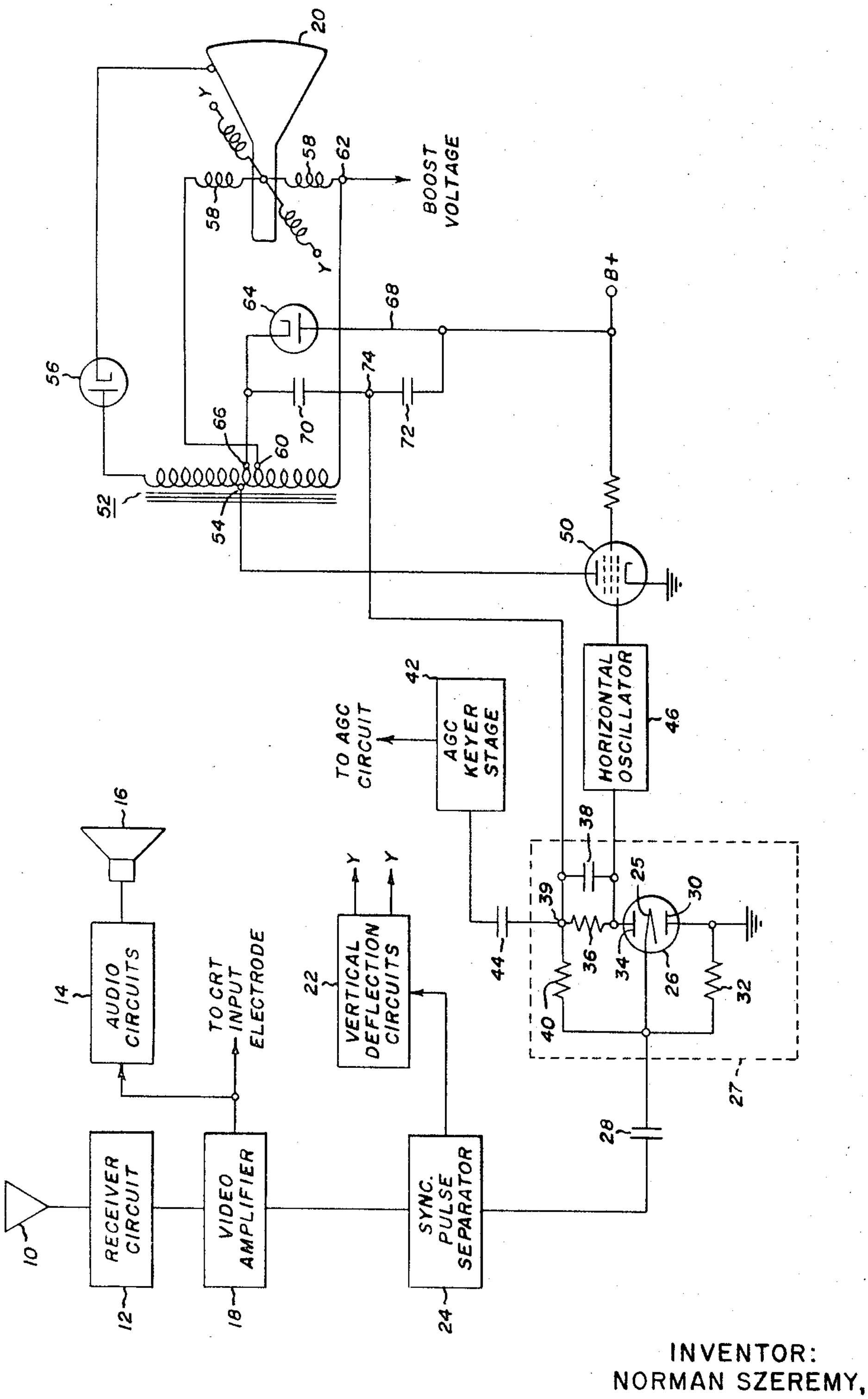
INVENTOR:
NORMAN SZEREMY,

1

3,452,153

PULSE CIRCUIT FOR HORIZONTAL OUTPUT CIRCUIT IN TELEVISION RECEIVER

Norman Szeremy, Syracuse, N.Y., assignor to General Electric Company, a corporation of New York Filed Sept. 14, 1966, Ser. No. 579,315
Int. Cl. H04n *5/38, 3/16;* H03b *3/04*
U.S. Cl. 178—7.3 2 Claims

ABSTRACT OF THE DISCLOSURE

A simplified arrangement for providing reference pulses to a phase detector which supplies control voltage to a horizontal oscillator in a television receiver including a horizontal output transformer. A damping rectifier is connected across at least part of the horizontal output transformer, and first and second serially-connected capacitors are connected across the damping rectifier. Reference pulses are derived from an output point at the common junction of the capacitors. In addition, pulses may be coupled from this output point through a capacitor to key an automatic gain control circuit.

The present invention relates to television receivers and more particularly to an improved pulse circuit for use in the horizontal output circuit in such receivers.

In television receivers an electron beam is deflected horizontally across the face of a cathode ray tube by applying a sawtoothed deflection voltage to a deflection winding mounted on the neck of the cathode ray tube. The deflection voltage is applied across the windings of an output transformer connected across the deflection windings, which transformer is driven by an oscillator through an interposed driver tube. Control voltages for regulating the phase of the voltage developed by this oscillator are provided by a phase detector having two inputs. The first input is from a synchronizing pulse separator which separates synchronizing pulses from a received television signal before applying the pulses to the input. The second input on many low cost receivers is from a reference winding inductively coupled to the output transformer.

This reference winding, capacitively coupled to the second input through a blocking capacitor, gives rise to voltages which appear as reference pulses at the second input, which pulses are in phase with the voltages induced in the output transformer. When the reference pulses and the synchronizing pulses have a predetermined phase relationship, the output of the phase detector has a zero value and does not affect the operation of the oscillator. However, any deviation from this predetermined phase relationship will cause a correction voltage to be applied to the oscillator to re-establish the desired phase relationship. The same reference winding is also frequently used to provide keying pulses for an automatic gain control stage, commonly referred to as a keyer, which supplies regulating voltage to regulated signal amplifying stages.

While the performance of the described circuit is generally satisfactory, its cost and complexity is less than completely satisfactory in that the additional reference winding must be used along with the blocking capacitor. Due to the high capacitance required of the blocking capacitor, it is a relatively costly device.

To obviate the need for such a separate reference winding and such a blocking capacitor, the present invention contemplates the use of an improved reference pulse circuit connected across at least part of a horizontal output transformer. The circuit includes a damping rectifier connected in parallel with two or more serially-connected capacitors. Reference pulses may be derived from this circuit at an output point located between adjacent ones of the capacitors.

2

While the specification concludes with claims particularly pointing out and distinctly claiming that which is regarded as the present invention, the invention itself along with its further objects and advantages may be more readily ascertained from the following detailed description when read in conjunction with the accompanying drawings in which:

FIGURE 1 is a television receiver circuit diagram, partially in block form, showing the improved pulse circuit of the present invention with those circuits most closely associated with it.

FIGURE 1 shows a television receiver having an antenna 10 adapted to receive a transmitted television signal and to apply that signal to receiver circuits 12 which may include a radio frequency amplifier section, a converter section, an intermediate frequency amplifier section, and a detector. Composite video information contained in the television signal is conducted to a video amplifier 18 which provides amplified signals for the input electrode of a cathode ray tube 20, for the audio circuits 14 terminating in speaker 16, and for a synchronizing pulse separator 24.

The synchronizing pulse separator 24 passes vertical synchronizing pulses to the vertical deflection circuits 22 and horizontal synchronizing pulses through coupling capacitor 28 to a horizontal phase detector 27 or, more specifically, to a cathode 25 in a dual diode 26 in the phase detector 27. A first anode 30 of the dual diode 26 is connected directly to ground and indirectly to the cathode 25 through balancing resistor 32. A second anode 34 is also coupled to the cathode 25 through the parallel combination of a resistor 36 and a capacitor 38, which combination is further connected in series at a junction 39 with a balancing resistor 40. An automatic gain control keyer stage 42 may be coupled to the junction 39.

The anode 34 of the diode 26 is connected to the input of a horizontal oscillator 46 which, as is well known in the art, may consist of a sine wave oscillator having an output circuit which produces a sawtoothed deflection voltage. The output of the horizontal oscillator 46 is applied to the signal grid of a driver tube 50 having its plate connected directly to a horizontal output transformer 52 at junction 54.

In a preferred embodiment of the invention, the horizontal output transformer 52 consists of an autotransformer having its upper end connected through a high voltage rectifier 56 to the cathode ray tube 20 to provide a beam-accelerating potential on the face of the tube. Horizontal deflection windings 58 are connected across a part of the transformer 52 between an upper junction 60 and a lower junction 62 at the lower end of the transformer 52. The voltage established at the junction 62 has a greater magnitude than the regular of B+ supply voltage for the television receiver and is useful as a plate supply voltage in such circuits as the horizontal oscillator, the vertical oscillator, and the audio detector circuit in the receiver.

To damp transient oscillations which would be set up in the horizontal deflection windings 58 due to repeated current cutoff in the driver tube, a damping rectifier 64 has been provided. The cathode of the damping rectifier 64 is connected to the transformer 52 at a junction 66 whereas its plate is connected to a B+ power supply through a lead 68. A pair of capacitors 70 and 72 having a common junction 74 are connected across the damping rectifier 64, i.e., between the junction 66 and the lead 68. The common junction 74 serves as an output point for the improved pulse circuit of the present invention.

When a deflection voltage is established across the transformer 52, a reference pulse is produced at the output or common junction 74 of the capacitors 70 and 72. This reference pulse is applied to the junction 39 of the horizontal phase detector 27. If the reference pulses applied to the junction 39 have a desired phase relative to the synchronizing pulses applied at the cathode 25, the horizontal phase detector 27 has a zero output. If, however, the reference pulses do not have the desired phase relative to the synchronizing pulses, a correction voltage will appear on anode 34 which, in turn, affects the operation of the horizontal oscillator 46 so as to bring the two sets of pulses back into their predetermined phase relationship.

The reference pulse appearing at point 39 is also of the correct phase, polarity, and amplitude to drive a keyer tube in the automatic gain control stage 42. The reference pulse is coupled through capacitor 44 to the plate of the keyer tube contained in the keyer stage 42 to perform this function.

While there has been described at present what is regarded as a preferred embodiment of the present invention, modifications and variations therein may occur to those skilled in the art. For instance, the transformer 52 may easily be replaced by an equivalent conventional transformer having the plate circuit of the driver tube 50 connected to its primary winding with the remainder of the circuits connected to its secondary winding. Further, although the circuit described embodies vacuum tubes and rectifying devices, it is well within the purview of the present invention that these may be replaced by their solid state equivalents.

Since these and other modifications may be obvious to those skilled in the art, it is intended that the appended claims shall cover all such modifications and variations as fall within the true spirit and scope of the invention.

What I claim as new and desire to secure by Letters Patent of the United States is:

1. In a television receiver having a horizontal output circuit including an output transformer, an output tube connected to the transformer for supplying a deflection voltage thereto, an oscillator for driving the output tube, and a phase detector for providing a control voltage for the oscillator, the phase detector having a first input for synchronizing pulses contained in a received television signal and a second input for reference pulses in the correct phase with the deflection voltage applied to the transformer, an improved pulse circuit for providing the reference pulses including:

(a) a damping rectifier connected across at least part of the output transformer;

(b) first and second serially-connected capacitors connected across said damping rectifier; and (c) an output point at the common junction of said capacitors for providing an electrical path between said pulse circuit and the second input of the phase detector.

2. The improved pulse circuit as recited in claim 1 in further combination with an automatic gain control keyer stage having an input capacitor, said pulse circuit including conductor means connecting said output point to said input capacitor.

References Cited

UNITED STATES PATENTS

| | | | |
|---|---|---|---|
| 2,906,818 | 9/1959 | Goodrich | 178—7.3 |
| 3,361,874 | 1/1968 | Knoebel et al. | 178—7.3 |

ROBERT L. GRIFFIN, *Primary Examiner.*

ROBERT L. RICHARDSON, *Assistant Examiner.*

U.S. Cl. X.R.

331—20